Dec. 22, 1936.　　　　　E. ENGEL　　　　　2,065,176

VEHICLE BRAKE

Filed June 14, 1935　　　2 Sheets-Sheet 1

Inventor
Ernst Engel
By Sommers Young
Attys

Dec. 22, 1936.  E. ENGEL  2,065,176

VEHICLE BRAKE

Filed June 14, 1935  2 Sheets-Sheet 2

Inventor
Ernst Engel
By Sommers & Young
Attys

Patented Dec. 22, 1936

2,065,176

UNITED STATES PATENT OFFICE 2,065,176

VEHICLE BRAKE

Ernst Engel, Frankfort-on-the-Main, Germany, assignor to Alfred Teves Maschinen- und Armaturen-Fabrik Gesellschaft mit beschrankter Haftung, Frankfort-on-the-Main, Germany Application June 14, 1935, Serial No. 26,675
In Germany June 21, 1934

6 Claims. (Cl. 188—265)

In the known brake constructions provided with a locking device for holding the brakes in the applied position it is possible for the driver to withdraw the pressure-applying device serving for actuating the brake before he has released the locking device. If this occurs, the continuity of the braking fluid in the pressure cylinder and in the pipe line is interrupted and, in consequence of the production of a vacuum, air may pass into the brake conduit from the outside so that an air cushion is produced which detrimentally affects the braking effect when the brakes are next applied.

The primary object of the present invention is to avoid this disadvantage and with this object in view the brake actuating mechanism is improved in that in the reverse motion of pressure-applying device, such as a hand-wheel operating on the piston of a pressure cylinder, the locking device is in the first place released entirely automatically and then the pressure applying the brakes is withdrawn. This can be attained in that the hand-wheel is axially displaceable on threads provided on its shaft and during this displacement in the rearward rotation first actuates the means for releasing the locking device. This actuation can either be effected directly or indirectly by means of a lever transmission or the like.

In the accompanying drawings which illustrate certain constructional forms of the invention by way of example:

Figure 1:
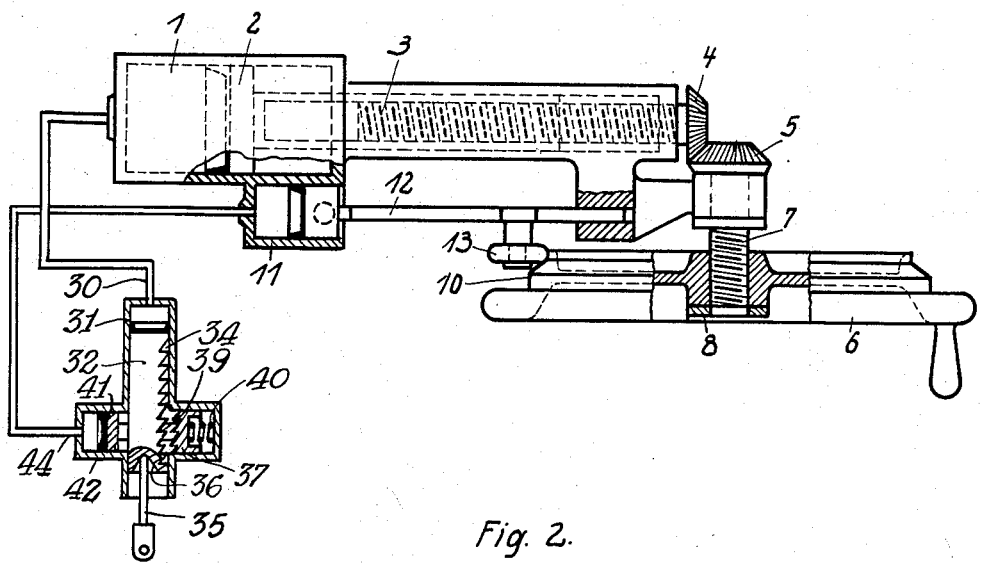
Fig. 1 shows one embodiment in partial section.

In the embodiment according to Fig. 1 the pressure medium for applying the brakes is contained within a cylinder 1, in which operates a piston 2. The piston 2 is provided with a hollow internally threaded piston rod in which a spindle 3 is in threaded engagement. To enable rotation of the spindle 3 for displacing the piston 2 within the cylinder 1 the spindle 3 carries on its free end a bevel gear wheel 4 in which engages a bevel gear wheel 5 fast on a threaded shaft 7.

The hand-wheel 6 for actuating the brake is carried on the threaded spindle 7 which is provided at its outer end with flange or collar 8, for limiting movement of hand wheel 6 on shaft 7, whereby when the hand wheel engages the cam 8 its turning movement is applied to shaft 7. The inner edge 10 of the hand wheel 6 is constructed in the form of a cam.

The hydraulic cylinder serving for releasing the brake locking device is shown at 11. The rod 12 attached to the piston operating in the cylinder 11 carries on one side a roller 13 which runs on the cam 10 of the hand-wheel 6.

If for the purpose of applying the brakes the hand-wheel 6 is rotated so as to travel along the spindle 7 away from the bevel gear wheel 5 then in the first place the hand-wheel travels along the spindle 7 without rotating the latter until the flange or collar 8 on the spindle is engaged. Then the spindle 7 is caused to rotate with the hand-wheel 6 and the spindle 3 is set in rotation by way of the bevel gear wheels 5 and 4 whereby the piston 2 is displaced within the pressure cylinder 1.

When the brake is to be released again, the hand-wheel 6 is rotated in the opposite direction. It then first travels in the axial direction on the threaded spindle 7 so that the coupling flange or collar 8 is disengaged so that initially the spindle 7 and thus the bevel gear wheel 5 remain at rest until the hub of the hand wheel 6 abuts against the hub of the bevel gear wheel 5. The bevel gear wheel 5 is then caused to rotate with the hand-wheel 6 and the brake piston 2 is displaced in the other direction within the pressure cylinder 1. In the axial movement of the hand-wheel 6 on the threaded spindle 7 however the cam 10 has occasioned the displacement of the roller 13 and thus of the piston rod 12 and the piston carried thereon in the release cylinder 11, so that the device locking the brake jaws is released before the rearward motion of the piston 2 of the pressure cylinder 1 occurs. Consequently it is not possible for the liquid column within the brake conduit to be interrupted.

From the main cylinder 1 the passage 30 goes to a cylinder 31 in which there is a piston 32 provided below with a rack 34. The rod mechanism 35 leading to the brake jaws abuts the opposite end of the rack 34 from the cylinder 31 in a socket 36.

The rack 34 may be engaged by a check block 37 which has corresponding teeth 39 and is pressed upwardly by a spring 40 into the rack 34. Connected with this check block is a piston 41 which is movable in a cylinder 42, the latter being connected through the passage 44 with the cylinder 11, that is, with the cylinder of the brake mechanism.

The operation is one in which braking is effected by turning the hand wheel 6 whereby the screw spindle 3 is moved downwardly through the gears 5 and 4 and the piston 2 therewith exerts pressure in the cylinder, so that, through the passage 30 pressure arises behind piston 32 in cylinder 31 whereby, through the rod 35, the brake jaws are applied on the brake drum and the braking is effected. At this point the check member 37 has its teeth 39 pressed into the rack 34 through the action of spring 40 and firmly retains the piston 32 in the braking position.

When the brakes are to be released hand wheel 6 is turned backward, whereby it first moves on a screw spindle 7 before acting on gears 5 and 4. In this rightward movement of the hand wheel 6 the piston 11 is moved by lever 19 (Fig. 3) in its cylinder and pressure is thereby produced in the passage 44. This pressure passes to the piston 41 in cylinder 42 and forces it and the check member 37 to the right, so that the teeth of this member 37 withdraw from racks 34 and release them. The check device of the brake is thereby released, and if hand wheel 6 is turned further backward it again draws back the piston 2 in cylinder 1 through the gears 4, 5 and spindle 3, so that the fluid column in passage 30 can again pass back to cylinder 1 and pressure on piston 32 ceases. The piston 32 is then subjected to the action of the withdrawal spring, not shown, mounted on the brake jaws, and which is provided on every ordinary brake, and passes back to the initial position, and the brake is released. This specific check mechanism is not a part of the present application, but only control mechanism therefor.

Figure 2:
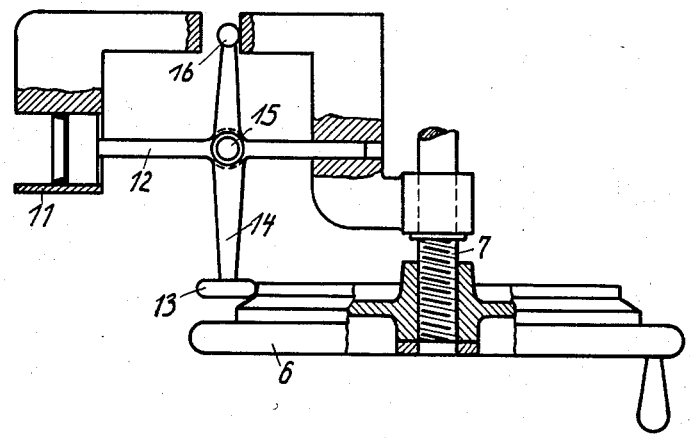
Fig. 2 shows a fragmentary view of a second embodiment.

In order to make the stroke of the piston rod 12 correspondingly small, the cam 10 can be made correspondingly steep in the axial direction. It is however also possible to interpose between the roller 13 and the piston rod 12 a lever transmission or other transmission mechanism as indicated in the embodiment according to Fig. 2. Here the roller 13 is carried on a lever 14 which is pivoted at 16 and engages the piston rod 12 of the release cylinder 11 at 15. The resultant lever ratio reduces the displacement of the piston rod 12. Otherwise this embodiment operates precisely in the same way as that described above. In other respects the embodiment of Fig. 2 may be similar to Fig. 1.

Figure 3:
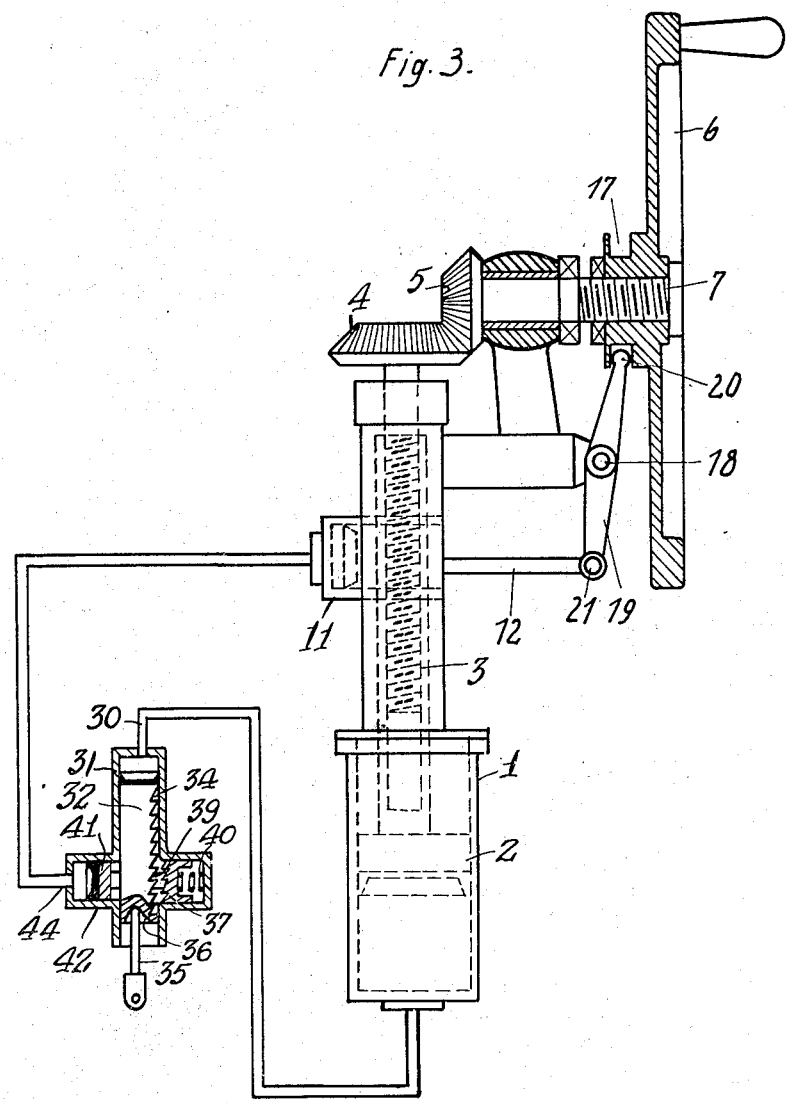
Fig. 3 shows a third embodiment.

In the embodiment according to Fig. 3 the hand-wheel 6 carries a guide 17 in which engages the end 20 of a lever 19 pivoted at 18. The other end of this lever directly engages the piston rod 12 of the hydraulic piston of the locking device.

When the hand-wheel 6 is rotated reversely then it again travels along the threaded spindle 7 and the guide 17 carries the end 20 of the lever 19 along with it so that the other end 21 of this lever operates on the piston rod 12 of the mechanism for releasing the locking device. Instead of the lever 19 naturally any other transmission arrangement can be employed. Instead of inserting a lever transmission between handwheel and piston rod, it is possible with a suitable arrangement for the lateral surface of the hand-wheel to operate directly on the piston rod. The mechanism for locking the brakes in applied position may be similar to that described in connection with the embodiment represented by Fig. 1.

I claim:—

1. In a hydraulic brake system for vehicles a device for locking the brakes in the applied position, operating means rotatable in one direction for applying the brakes and in the other direction for releasing the brakes, the initial part of the rotary movement of said operating means in said other direction being idle movement for brake releasing purposes, by providing axial movement thereof, and means actuated by said operating means during said idle rotary movement and axial movement for releasing said locking device.

2. In a vehicle brake system including a device for locking the brakes in the applied position, control mechanism comprising a threaded shaft rotatable in opposite directions to apply and release the brakes, a hand wheel adapted to screw along said threaded shaft, abutments limiting the travel of said hand wheel along said shaft, and means for releasing said locking device, said means being engaged by said hand wheel during its travel along said shaft in consequence of rotation of said hand wheel on said shaft in the same direction as said shaft is rotated for releasing the brakes.

3. In a vehicle brake system including a device for locking the brakes in the applied position, control mechanism as claimed in claim 2 comprising a cam carried on the hand wheel, a roller co-operating with said cam, a slidable rod carrying said roller and associated with means for releasing said locking device.

4. In a vehicle brake system including a device for locking the brakes in the applied position, control mechanism as claimed in claim 2 comprising a cam carried on the hand wheel, a roller co-operating with said cam, a pivoted lever carrying said roller at its free end, a slidable rod engaging said pivotal lever at an intermediate point, and means for releasing said locking device associated with said slidable rod.

5. In a hydraulic brake system for vehicles, a device for locking the brakes in the applied position, operating means rotatable in one direction for applying the brakes and in the other direction for releasing the brakes, the initial part of the rotary movement of said operating means in said other direction being idle movement for brake releasing purposes, but providing axial movement thereof, means actuated by said operating means during said idle rotary movement and axial movement for releasing said locking device, said locking device releasing means comprising displaceable means engaged by the movable brake operating means during its idle motion, and a transmission mechanism coupling said displaceable means releasing the locking device.

6. In a vehicle brake system including hydraulic brakes and a device for locking the brakes in the applied position, control mechanism comprising a cylinder containing the hydraulic medium, a piston operating within said cylinder, a hollow internally threaded rod attached to said piston, a rotatable but non-translatable screw engaging in said internal thread, a bevel gear wheel secured to said screw, a rotatable but non-translatable threaded shaft, a bevel gear wheel secured to said shaft and engaging with the first bevel gear wheel, a hand wheel in threaded engagement with said shaft, abutments on said shaft to limit the axial displacement of said hand wheel, a member engaged and displaced by said hand wheel during its displacement in one direction, and means for releasing the locking device linked to said member.

ERNST ENGEL.